United States Patent
Das et al.

(10) Patent No.: US 11,227,102 B2
(45) Date of Patent: Jan. 18, 2022

(54) SYSTEM AND METHOD FOR ANNOTATION OF TOKENS FOR NATURAL LANGUAGE PROCESSING

(71) Applicant: Wipro Limited, Bangalore (IN)

(72) Inventors: Rishav Das, Howrah (IN); Sourav Mudi, Madhabdihi (IN)

(73) Assignee: Wipro Limited, Bangalore (IN)

( * ) Notice: Subject to any disclaimer, the term of this patent is extended or adjusted under 35 U.S.C. 154(b) by 54 days.

(21) Appl. No.: 16/359,637

(22) Filed: Mar. 20, 2019

(65) Prior Publication Data
US 2020/0293611 A1    Sep. 17, 2020

(30) Foreign Application Priority Data
Mar. 12, 2019    (IN) .............................. 201941009531

(51) Int. Cl.
  *G06F 40/169*    (2020.01)
  *G06F 40/40*    (2020.01)
(52) U.S. Cl.
  CPC ............ *G06F 40/169* (2020.01); *G06F 40/40* (2020.01)
(58) Field of Classification Search
  CPC .............................. G06F 40/40; G06F 40/169
  See application file for complete search history.

(56) References Cited

U.S. PATENT DOCUMENTS

| 6,523,026 | B1 * | 2/2003 | Gillis | G06F 16/3332 |
| 9,092,420 | B2 * | 7/2015 | Kim | G06F 40/253 |
| 2004/0243560 | A1 * | 12/2004 | Broder | G06F 16/319 |
| 2005/0228783 | A1 * | 10/2005 | Shanahan | G06K 9/6269 |
| 2006/0074824 | A1 * | 4/2006 | Li | G06F 16/2465 706/20 |
| 2007/0043696 | A1 * | 2/2007 | Haas | G06F 16/8365 |
| 2007/0136336 | A1 * | 6/2007 | Shanahan | G06F 16/35 |
| 2008/0319735 | A1 * | 12/2008 | Kambhatla | G06F 40/30 704/9 |
| 2009/0070103 | A1 * | 3/2009 | Beggelman | G06F 40/20 704/9 |
| 2011/0202886 | A1 * | 8/2011 | Deolalikar | G06F 16/353 715/853 |
| 2012/0179454 | A1 * | 7/2012 | Kim | G06F 40/253 704/9 |
| 2015/0134336 | A1 * | 5/2015 | Huang | G06F 16/36 704/254 |
| 2015/0149461 | A1 * | 5/2015 | Aguilar Lemarroy | G06F 16/35 707/737 |
| 2015/0242762 | A1 * | 8/2015 | Cox | G06Q 30/0621 706/11 |

(Continued)

*Primary Examiner* — Fariba Sirjani
(74) *Attorney, Agent, or Firm* — Finnegan, Henderson, Farabow, Garrett & Dunner, LLP

(57) ABSTRACT

This disclosure relates to method and system for annotating tokens for natural language processing (NLP). In one embodiment, the method may include segmenting a plurality of corpus based on each of a plurality of instances, deriving a plurality of entities for each of the plurality of instances based on at least one of a machine learning technique or a deep learning technique, determining a word vector for each of the plurality of entities associated with each of the plurality of instances, and labelling a plurality of tokens for each of the plurality of instances. It should be noted that the plurality of tokens associated with the plurality of entities may be identified based on a frequency of each of the plurality of entities.

12 Claims, 6 Drawing Sheets

(56) References Cited

U.S. PATENT DOCUMENTS

| | | | |
|---|---|---|---|
| 2016/0111016 A1* | 4/2016 | Govindaraj | G09B 19/00 |
| | | | 434/156 |
| 2016/0352656 A1* | 12/2016 | Galley | G06N 3/0454 |
| 2017/0091320 A1 | 3/2017 | Psota et al. | |
| 2017/0351952 A1* | 12/2017 | Zhang | G06N 3/0454 |
| 2018/0060727 A1* | 3/2018 | Rainwater | G06N 3/0454 |
| 2018/0075013 A1 | 3/2018 | Razack et al. | |
| 2018/0114142 A1* | 4/2018 | Mueller | G06F 16/906 |
| 2018/0268298 A1* | 9/2018 | Johansen | G06F 40/30 |
| 2018/0341862 A1* | 11/2018 | Ehrman | G06N 20/00 |
| 2019/0034416 A1* | 1/2019 | Al Hasan | G06N 3/0454 |
| 2019/0043487 A1* | 2/2019 | Rivkin | G10L 15/32 |
| 2019/0180196 A1* | 6/2019 | Terry | G06K 9/6256 |
| 2019/0244103 A1* | 8/2019 | Wang | G06N 3/0454 |
| 2019/0294695 A1* | 9/2019 | Stoyanovsky | G06F 40/30 |
| 2019/0392035 A1* | 12/2019 | Indenbom | G06F 40/284 |
| 2020/0034749 A1* | 1/2020 | Kumar | G06F 16/93 |
| 2020/0184016 A1* | 6/2020 | Roller | G06N 20/10 |

\* cited by examiner

SYSTEM AND METHOD FOR ANNOTATION OF TOKENS FOR NATURAL LANGUAGE PROCESSING

This application claims the benefit of Indian Patent Application Serial No. 201941009531, filed Mar. 12, 2019, which is hereby incorporated by reference in its entirety.

FIELD

This disclosure relates generally to natural language processing (NLP), and more particularly to method and system for annotating tokens for NLP applications.

BACKGROUND

Natural language processing (NLP) is a powerful deep learning tool in the field of artificial intelligence (AI) that deals with understanding, processing, and generation of natural language. A wide variety of applications including, but not limited to, search engine optimization (SEO) and chatbots employ deep learning based NLP engines. Typically, NLP engines employ artificial neural network (ANN) models including, but not limited to, recurrent neural network (RNN) models, long short-term memory (LSTM) models, and convolutional neural network (CNN) models. These models require annotated training dataset for their learning. However, it is effort and time intensive to prepare the training dataset.

For example, the human intervention for designing the entities and their values for natural language processing is not only difficult but also time-intensive. The completion of training dataset may require several weeks when it comes to designing enterprise level chatbot. Such training dataset may include, but may not be limited to, ordinal training data, nominal training data, numerical training data, or the like. Moreover, annotation of training dataset (i.e., labeling of the training data) may be an important factor so that the ANN model (e.g., LSTM model) may understand the word vectors where they need to stress on the weights, bias, etc. This may pose serious challenges to data scientist, machine learning engineer to annotate the word vectors with different set of entities, intents, and manual labelling.

Conventional methods for annotating tokens are limited in their scope and utility. For example, the conventional methods may not help to annotate the whole dataset for training purpose. Additionally, conventional methods are based on pre-defined tokens that may require subsequent labelling for training the ANN model. Moreover, based on defined entities, values need to be labeled by an end user. Hence, the conventional methods need human involvement at some stage or the other, and does not have any inbuilt intelligence.

SUMMARY

In one embodiment, a method of annotating tokens for natural language processing (NLP) is disclosed. In one example, the method may include segmenting a plurality of corpus based on each of a plurality of instances. The method may further include deriving a plurality of entities for each of the plurality of instances based on at least one of a machine learning technique or a deep learning technique. The method may further include determining a word vector for each of the plurality of entities associated with each of the plurality of instances. The method may further include labelling a plurality of tokens for each of the plurality of instances. It should be noted that the plurality of tokens associated with the plurality of entities may be identified based on a frequency of each of the plurality of entities.

In one embodiment, a system for annotating tokens for NLP is disclosed. In one example, the system may include an automatic annotation device that may include at least one processor and a memory communicatively coupled to the at least one processor. The memory may store processor-executable instructions, which, on execution, may cause the processor to segment a plurality of corpus based on each of a plurality of instances. The processor-executable instructions, on execution, may further cause the processor to derive a plurality of entities for each of the plurality of instances based on at least one of a machine learning technique or a deep learning technique. The processor-executable instructions, on execution, may further cause the processor to determine a word vector for each of the plurality of entities associated with each of the plurality of instances. The processor-executable instructions, on execution, may further cause the processor to label a plurality of tokens for each of the plurality of instances. It should be noted that the plurality of tokens associated with the plurality of entities may be identified based on a frequency of each of the plurality of entities.

In one embodiment, a non-transitory computer-readable medium storing computer-executable instructions for automatic annotating tokens for NLP is disclosed. In one example, the stored instructions, when executed by a processor, may cause the processor to perform operations including segmenting a plurality of corpus based on each of a plurality of instances. The operations may further include deriving a plurality of entities for each of the plurality of instances based on at least one of a machine learning technique or a deep learning technique. The operations may further include determining a word vector for each of the plurality of entities associated with each of the plurality of instances. The operations may further include labelling a plurality of tokens for each of the plurality of instances. It should be noted that the plurality of tokens associated with the plurality of entities may be identified based on a frequency of each of the plurality of entities It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
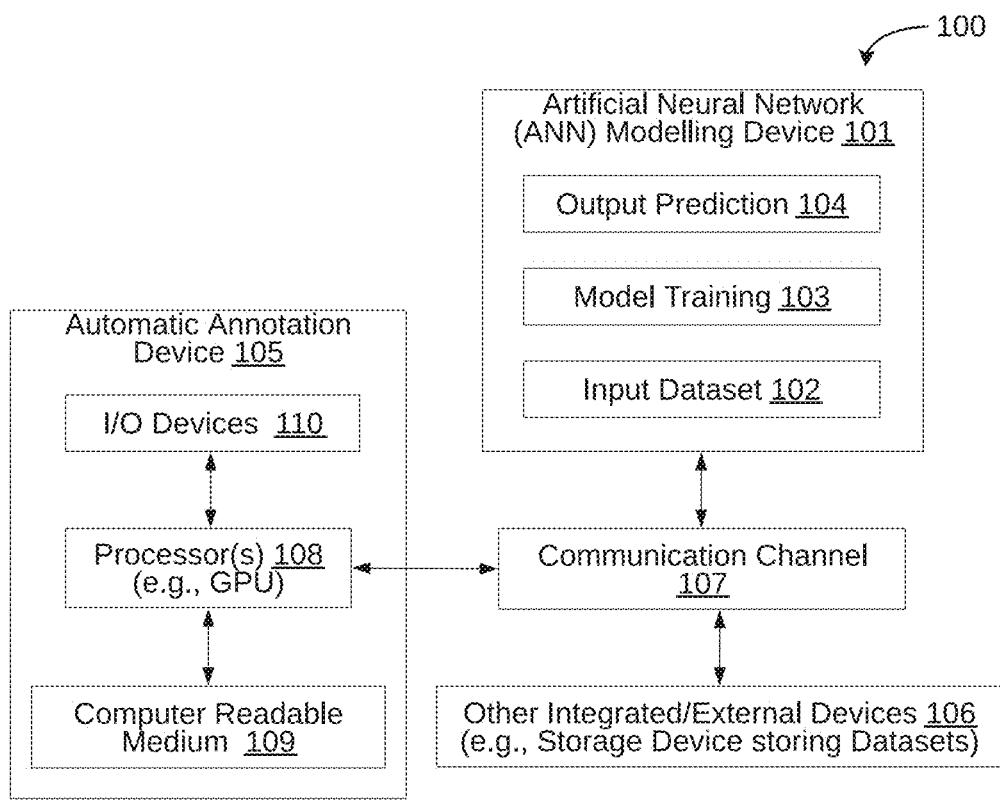
FIG. 1 is a block diagram of an exemplary system for annotating tokens for natural language processing (NLP) applications, in accordance with some embodiments of the present disclosure.

Referring now to FIG. 1, an exemplary system 100 for annotating tokens for natural language processing (NLP) applications, is illustrated in accordance with some embodiments of the present disclosure. The system 100 may include an artificial neural network (ANN) modelling device 101 for building, training, and implementing an ANN model for the NLP. In particular, the ANN modelling device 101 may be responsible for receiving and processing input dataset at block 102, training the ANN model at block 103, and output prediction at block 104. The system 100 may further include an automatic annotation device 105 for annotating tokens employed for NLP. As will be appreciated, each of these devices 101, 105 may be a computing device having data gathering and processing capability. For example, the each of these devices 101, 105 may include, but may not be limited to, server, desktop, laptop, notebook, netbook, tablet, smartphone, mobile phone, or the like. Additionally, the system 100 may include other integrated or external devices 106 such as integrated or networked storage device for storing datasets, remote servers or computing systems (for example, of service providers), remote digital devices (for example, of consumers), or field-installed products (for example, navigation systems, or the like).

The devices 101, 105, 106 may interact with each other over a communication channel 107 (for example, data bus, wired communication network (e.g., Ethernet), wireless communication network (e.g., Wi-Fi), mobile communication network (e.g., long term evolution (LTE) network), Internet, etc. that may support data delivery) for exchanging various data and instructions. For example, the automatic annotation device 105 may receive dataset from the storage device either directly or through the communication network. Further, the ANN modelling device 101 may receive dataset from the storage device either directly or through the automatic annotation device 105.

As stated above, the system 100 may implement the automatic annotation device 105 so as to annotate tokens for one or more NLP applications. As will be described in greater detail in conjunction with FIGS. 2-6, the automatic annotation device 105 may receive a plurality of dataset from a user. It should be noted that the plurality of dataset may be clubbed to form a plurality of corpus. Further, the automatic annotation device 105 may segment the plurality of corpus based on the plurality of instances, determine a plurality of entities for each of the plurality of instances, determine a word vector for each of the plurality of entities, and label a plurality of tokens for each of the plurality of instances.

The automatic annotation device 105 may include one or more processors 108, a computer-readable medium (e.g., a memory) 109, and an input/output device 110. Each of the one or more processors 108 may include a central processing unit (CPU) or a graphical processing unit (GPU). Typically, the GPU may include more parallel cores (say, about of 30-40 parallel cores) than the CPU (say, about 8 parallel cores).

The computer-readable storage medium 109 may store instructions that, when executed by the one or more processors 108, cause the one or more processors 108 to annotate the tokens employed for NLP, in accordance with aspects of the present disclosure. The computer-readable storage medium 102 may also store various data (e.g., datasets, corpus, ANN model, user input with respect to the ANN model, instances, entities, tokens, a pattern of tokens, accuracy threshold, pre-defined range, etc.) that may be captured, processed, and/or required by the automatic annotation device 105. The automatic annotation device 105 may interact with a user via the input/output device 110.

Figure 2:
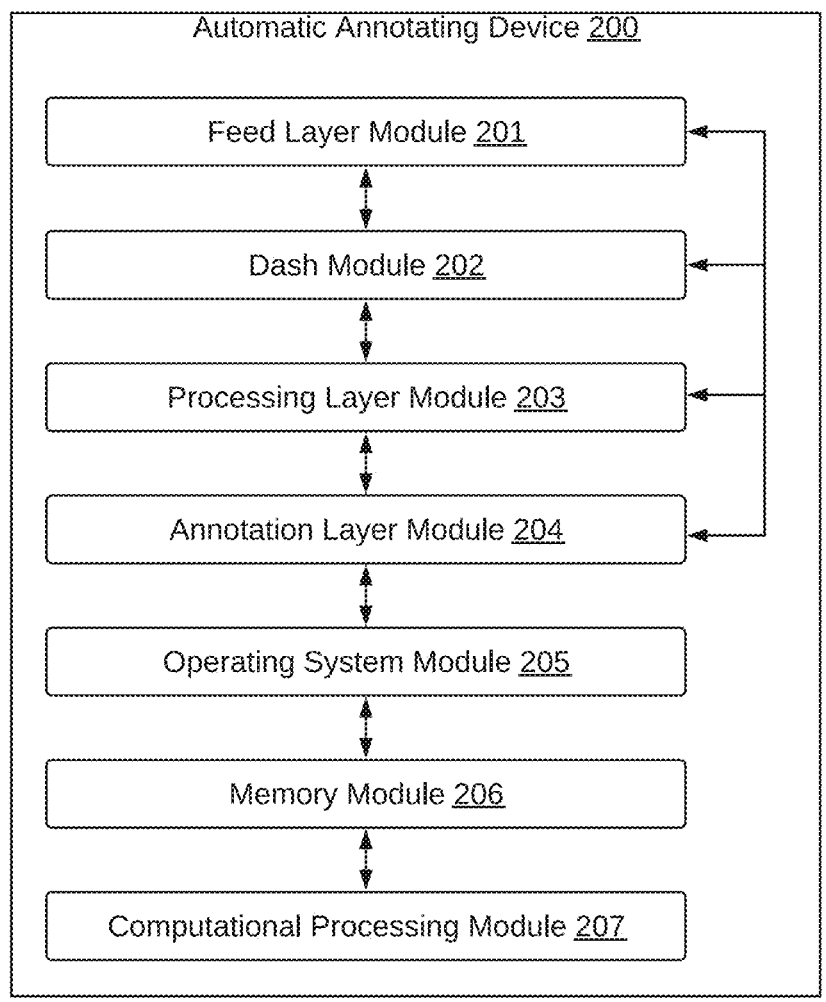
FIG. 2 is a functional block diagram of an automatic annotation device, implemented by the system of FIG. 1, in accordance with some embodiments of the present disclosure.

Referring now to FIG. 2, a functional block diagram of the automatic annotation device 200, implemented by the system 100 of FIG. 1, is illustrated in accordance with some embodiments of the present disclosure. The automatic annotation device 200 may include various modules that perform various functions so as to annotate tokens for the NLP. In some embodiments, the automatic annotation device 200 may include a feed layer module 201, a dash module 202, a processing layer module 203, an annotation layer module 204, an operating system (OS) module 205, a memory module 206, and a computational processing module 207. As will be appreciated by those skilled in the art, all such aforementioned modules 201-207 may be represented as a single module or a combination of different modules. Moreover, as will be appreciated by those skilled in the art, each of the modules 201-207 may reside, in whole or in parts, on one device or multiple devices in communication with each other. Each of the modules 201-207 may now be described in greater detail herein below.

The feed layer module 201 may enable the ANN to transact the plurality of corpus after getting signal from the dash module 202, upon completion of annotation and cleaning the plurality of dataset. The feed layer module 201 may send the plurality of corpus to the ANN, and further receives feedback from the ANN. The feedback may include, but may not be limited to, score of training, failure message, error code while computation, or the like. It should be noted that the dash module 202 may restore the plurality of corpus in case of any failure while training the ANN. Moreover, the feed layer module 201 may be controlled by the dash module 202. Additionally, a user dependent message may be passed by the ANN to a shell of an operating system or an application of the system 100 through the feed layer module 201.

The dash module 202 is an intelligent module that may handle processing of the plurality of corpus, selection of a plurality of values, annotation of the plurality of values in the training dataset, or the like, while training the ANN. Hence, all the operation handling part may be performed by the dash module 202. Additionally, the dash module 202 may provide initiation and connection of each layer involved in the system 100.

The processing layer module 203 may perform preprocessing of the training dataset prior to training of the ANN. The user may provide the plurality of dataset which may be processed in the processing layer module 203 before annotating the plurality of instance. The plurality of dataset may be processed based on the plurality of corpus and requirement of the user. The user may need to determine the plurality of instance and the plurality of entity. Further, based on the plurality of instance, the plurality of dataset may be injected by the user. Each of the plurality of dataset may not be labelled by the user, the processing layer module 203 may use the dash module 202 to stack all the layers with instance name and raw input of the dataset, or with entity name and raw input of the dataset. Upon arranging, the dataset may undergo automated tokenization, stemming, lemmatization, or like which is common in the NLP.

Figure 3:
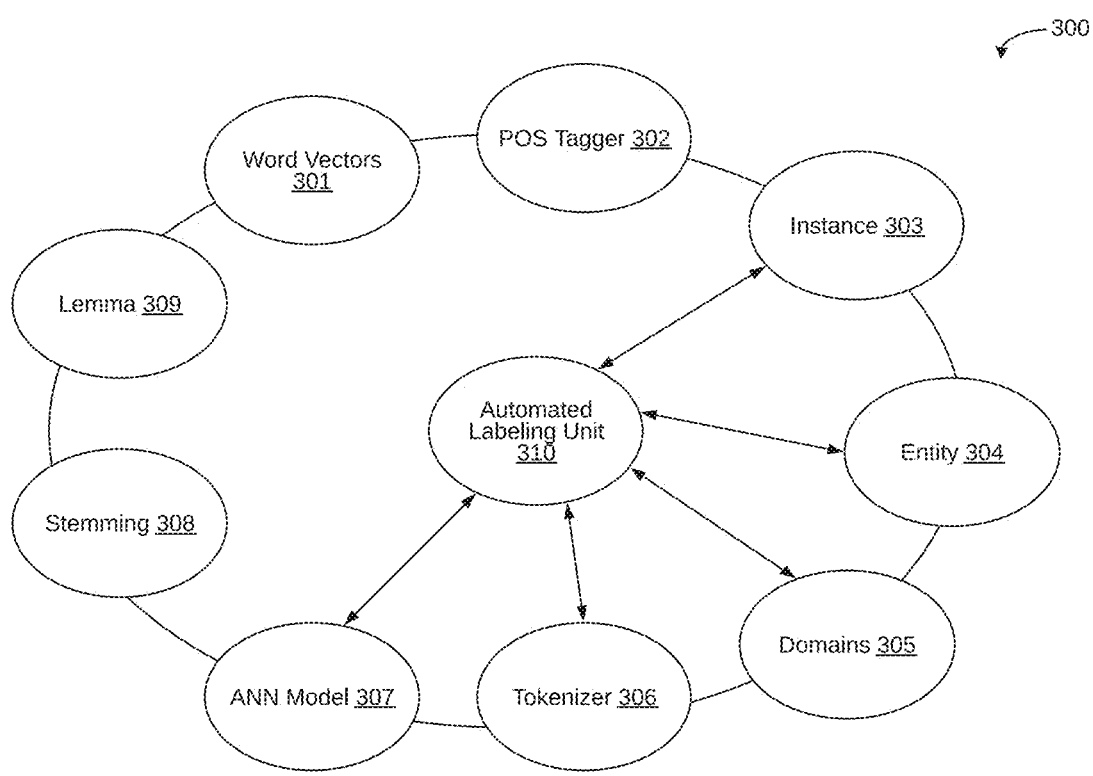
FIG. 3 is a model architecture of a NLP application, in accordance with some embodiments of the present disclosure.

Referring now to FIG. 3, a model architecture 300 of a NLP application is illustrated, in accordance with some embodiments of the present disclosure. In the illustrated embodiments, the model architecture may include a plurality of components, which, in turn, may include word vectors 301, POS tagger 302, instance 303, entity 304, domain 305, tokenizer 306, ANN model 307, stemming 308, and lemmatization 309. Moreover, each of the plurality of components of NLP may not be aligned in standard manner because the plurality of components may be a 'plugin and play' modules which may have other dependencies as well. But, the plurality of components may be used on sole purpose for solving a problem. By the way of an example, the word vectors 301 may be used for 'sentiment analysis' as well as for 'chatbot training processing methods'. Additionally, the ANN may be independent of word vector but dependent on stemming 308, tokenization 306, or the like. Hence, design or architecture of the NLP model may be based on an application for which NLP may be used.

Referring back to FIG. 2, the annotation layer module 204 may be responsible for labelling the plurality of instances and the plurality of entities after processing the plurality of corpus by the processing layer module 203. The labelling may include determining a specific token which make the meaning of the sentence. Hence, the labelling may be a search of the plurality of tokens required to make a morphological relation to the plurality of instances. For example, for a given sentence 'Please bring a cup of tea or coffee', the overall linguistic meaning may be to bring something in the cup and the values may be tea and coffee. Hence, tea and coffee may be the tokens of the given sentence which need to be trained and stressed upon to understand the required operation and morphological relation, and for the understanding of an object. Upon training the plurality of tokens in the ANN, the model may determine that tea and coffee may be related with cup. Hence, the tokens tea and coffee may be required tokens of the given sentence. Moreover, the annotation layer module 204 may use the dash module 202 to label the plurality of tokens for each of the plurality of instances. The labelling of the plurality of tokens may be an automated task by the ANN model.

The memory module 206 may be a virtual memory where all the process may operate while performing any type of operation. The memory module 206 may be used to store the plurality of dataset for processing layer module 203 to clean and process the plurality of corpus.

The OS module 205 is the heart of any computing system. The implementation may vary for GPU and CPU but work function may be, typically, same. The OS module 205 may include kernel and shell. The kernel may collaborate with deep learning and machine learning frameworks via a number of programming language. The programming language may pass the process control to the kernel of the OS, where the kernel may process with manipulation of hardware for execution of the event. The shell is the user interface that may pass the information to the kernel for further communication.

The computational processing module 207 may include the processor of CPU or GPU along with ALU, buses, PCI for computation of the process or residing the OS in order to operating using computational hardware. It should be noted that the computational processing module 207 may act as based where the overall system of the invention may reside and loaded.

The various modules 201-207 may communicate with each other or with associated/external devices (for example, storage device, ANN model, or the like) through various connections or interfaces. As will be appreciated, each of the connections or interfaces may acquire or transfer data from one module 201-207 or associated/external devices to other module 201-207 or associated/external devices using standard wired or wireless data connections means. For example, each of the connections or interfaces may employ one or more connection protocols including, but not limited to, serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, or the like.

It should be noted that the automatic annotation device 200 may be implemented in programmable hardware devices such as programmable gate arrays, programmable array logic, programmable logic devices, or the like. Alternatively, the automatic annotation device 200 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, comprise the module and achieve the stated purpose of the module. Indeed, a module of executable code may be a single instruction, or many instructions, and may even be distributed over several different code segments, among different applications, and across several memory devices.

As will be appreciated by one skilled in the art, a variety of processes may be employed for annotating tokens for subsequent training of an ANN model employed for NLP. For example, the exemplary system 100 and the associated automatic annotation device 200 may annotate tokens in the training dataset for training the ANN model employed for NLP by the processes discussed herein. In particular, as will be appreciated by those of ordinary skill in the art, control logic and/or automated routines for performing the techniques and steps described herein may be implemented by the system 100 and the associated automatic annotation device 200, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
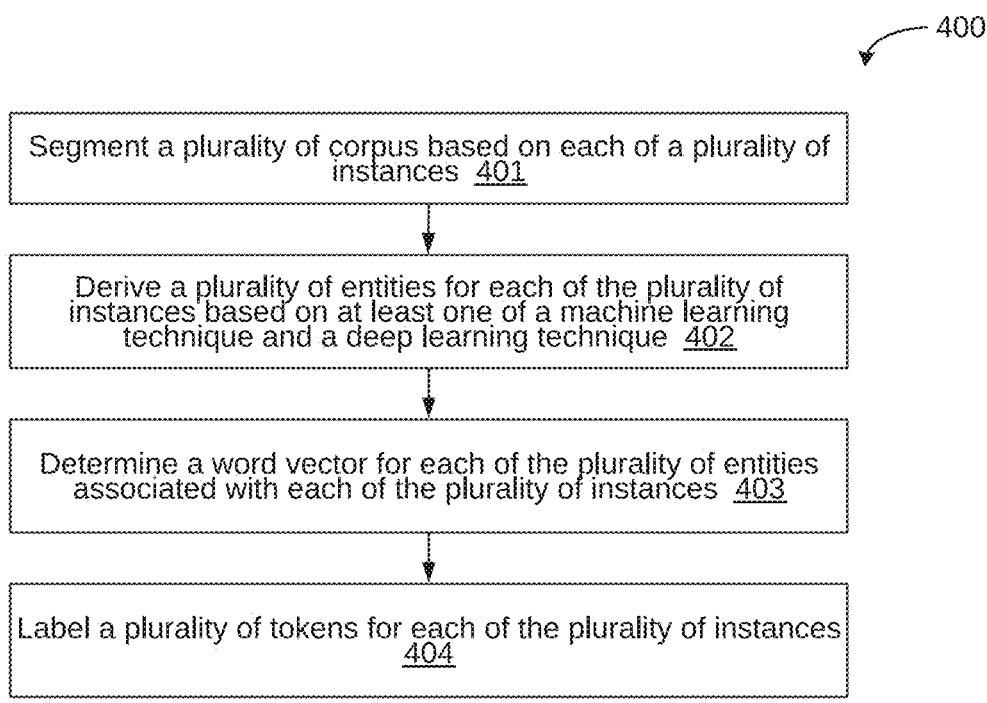
FIG. 4 is a flow diagram of an exemplary process for annotating tokens for NLP, in accordance with some embodiments of the present disclosure.

For example, referring now to FIG. 4, exemplary control logic 400 for annotating tokens for NLP, via a system, such as the system 100, is depicted via a flowchart in accordance with some embodiments of the present disclosure. As illustrated in the flowchart, the control logic 400 may include the steps of segmenting a plurality of corpus based on each of a plurality of instances at step 401, deriving a plurality of entities for each of the plurality of instances based on at least one of a machine learning technique or a deep learning technique at step 402, determining a word vector for each of the plurality of entities associated with each of the plurality of instances at step 403, and labelling a plurality of tokens for each of the plurality of instances at step 404. It should be noted that the plurality of tokens associated with the plurality of entities may be identified based on a frequency of each of the plurality of entities.

Additionally, in some embodiments, the control logic 400 may further include the step of receiving a plurality of dataset for the plurality of instances from at least one of a website, a portable document format (PDF), a research paper, a journal, an article, or the like. In such embodiments, the control logic 400 may further include the step of determining the plurality of corpus by clubbing each of the plurality of dataset. Additionally, in some embodiments, the control logic 400 may further include the steps of determining a pattern for each of the plurality of tokens based on an alphabetic embedding, and identifying a matching tokens of the plurality of tokens based on the pattern. It should be noted that the matching tokens may be used to identify at least one of a rhythm, a poetry, a prose, or the like.

In some embodiments, labelling a plurality of tokens at step 404 may include the steps of measuring an accuracy of each of the plurality of tokens for each of the plurality of instances using a confusion matrix and re-labelling the plurality of tokens for each of the plurality of instances when the accuracy is below an accuracy threshold. It should be noted that the accuracy threshold can be scaled up or scaled down based on a mistake performed by a neural network. In such embodiments, the control logic 400 may further include the step of training the neural network based on the plurality of tokens when the accuracy of each of the plurality of token is above the accuracy threshold. Additionally, in such embodiments, the control logic 400 may further include the steps of determining an accuracy value of each of the plurality of entities based on n-fold cross validation technique and re-labelling each of the plurality of tokens when the accuracy value is not in a predefined range.

Figure 5:
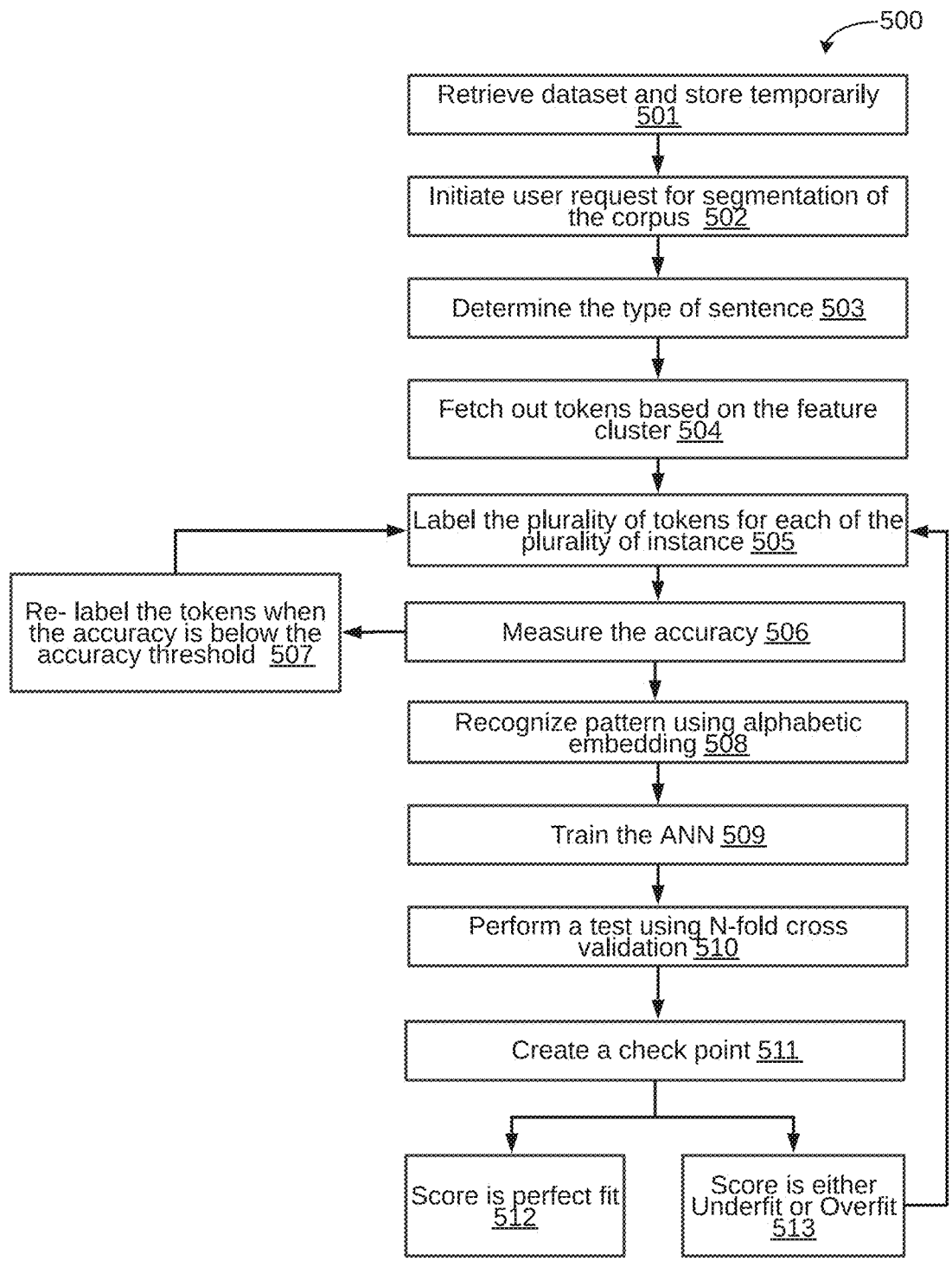
FIG. 5 is a flow diagram of a detailed exemplary process for annotating tokens for NLP, in accordance with some embodiments of the present disclosure.

Referring now to FIG. 5, exemplary control logic 500 for annotating tokens for NLP is depicted in further detail via a flowchart, in accordance with some embodiments of the present disclosure. As illustrated in the flowchart, the control logic 500 may include the steps of receiving the plurality of dataset by the user and storing temporarily in the memory at step 501, initiating the user request for segmentation of the plurality of corpus at step 502, determining the type of sentence at step 503, fetching out the plurality of tokens based on the feature cluster at step 504, labelling the plurality of tokens for each of the plurality of instances at step 505, measuring the accuracy at step 506, re-labelling the plurality of tokens when the accuracy is below the accuracy threshold at step 507, recognizing pattern using alphabetic embedding at step 508, training the ANN at step 509, performing a test using n-fold cross validation technique at step 510, creating a check point at step 511, and re-labelling of the plurality of tokens when the score is either underfit or overfit at step 513.

At step 501, the plurality of datasets may be created by the user which may be collected from a website, an applications, a portable document format (PDF), a research paper, a journal, an article, or the like. Further, the control logic 500 may retrieve the plurality of datasets and clubbed to form the plurality of corpus. It should be noted that the plurality of corpus may be specific to a domain for which the NLP application may be created and developed.

At step 502, the plurality of corpus, which may include bags of words, may be categorized for further usage. Upon storing the plurality of dataset, the control logic 500 may initiate the user request to segment the plurality of dataset based on the requirement. The segmentation may be performed by the user based on the plurality of instances, the plurality of entities and the values. The model may understand on the plurality of instances, the plurality of entities and the values, further train the ANN model accordingly. Hence, the segmentation may be performed on a generalized form.

For example, a given instance 'greeting' may include all the words of the plurality of corpus which means greeting to the linguistic form of the language whereas an another instance 'goodbye' may include statements, phrases, and clauses of the plurality of corpus which mean good bye in language. Upon segmenting the plurality of instances, the plurality of entities and the values may be determined from the plurality of corpus. The values may be name of the plurality of entities. For example, the plurality of entities associated with each of the plurality of instance may be food, vehicle, mobiles or the like whereas the values associated with a given entities 'vehicle' may include Alto, Scorpio, Hero Honda or the like. It should be noted that the segmentation may be performed manually before the ANN may be trained. Moreover, while specifying the plurality of instances and the plurality of entities, the control logic 400 may label the sentence in the form of regular expression or feed the sentence in the form of the word vector to the ANN.

At step 503, the control logic 500 may determine feature of a sentence based on the associated tokens. Basically the sentence may be categorize into three different types which may include positive, negative and neutral. Moreover, there may be multiple features of the sentence in English language, for example interrogative, statement, exclamatory or the like. It should be noted that the instance of the sentence may have determined based on the feature of the sentence. Moreover, the word vectors may help to determine, the type of sentence and the linguistic form of the sentence.

At step 504, the control logic 500 may fetch out the tokens and its associativity based on the feature cluster. It should be noted that associativity of the plurality of tokens may be fetched out based on at least one of the machine learning technique or deep learning technique. Moreover, combination of each of the plurality of tokens in the feature cluster may be represented as a feature in an apriori itemset. The apriori itemset may help to gain over the feature cluster parameter rather than only tokens. It should be noted that the support for the itemset may help to deal with anomalies as well. Further, the itemset with a higher support may be filtered out based on a predefined support threshold. It should be noted that the user may not need to filter out the plurality of tokens manually rather, the user may need to dump the plurality of dataset to the annotation layer.

At step 505, the control logic 500 may perform labelling of the plurality of tokens for each of the plurality of instances based on the machine learning technique. The labelling of the plurality of tokens may be used to determine the tokens which needs to be stressed on while training the ANN. At first, the control logic 500 may receive the word vectors for each of the plurality of entities associated with a given instance. Further, the plurality of the stop words may be removed from the word vectors. It should be noted that the stop words are those word which may not mean anything to the ANN while training the entity, but the stop words means to instance while training the linguistic form of the ANN. Further, the plurality of tokens associated with the plurality of entities may be identified based on a frequency of each of the plurality of entities.

By the way of an example, upon removal of the stop word, the count the frequency of a given word in the plurality of entity of a given corpus may be defined as Tent. Additionally, the total number of entity in the given corpus may be defined as Ncor and the number of instance containing the term Tent may be defined as NTent. Then, the actual number of the plurality of tokens, which need to be stressed, may be identified as:

$$\text{Tent} * \log\left(\frac{Ncor}{NTent}\right) \quad \text{Equation (1)}$$

In some embodiments, only first and second tokens of the plurality of tokens may be considered for labelling due to high accuracy. It should be noted that the control logic 500 may label the tokens automatically and further stores the tokens in the memory.

Further, the control logic 500 may measure an accuracy at step 506. The accuracy of the tokens may need to be measured before training the ANN and the label of accuracy may be measured using confusion matrix formulation. Hence, the control logic 500 may rectify the number of tokens which may be labeled as a false positive based on an accuracy threshold. In some embodiments, the user intervention may be required while measuring the label of accuracy. Further, the label of accuracy may be measured as:

$$\frac{(\text{True positive} + \text{True negative})}{(\text{True positive} + \text{True negative} + \text{False Positive} + \text{False Negative})} \quad \text{Equation (2)}$$

It should be noted that the accuracy threshold may be tuned based on the mistake performed by the ANN. Additionally, while auto check, the control logic 500 may match the tokens which may be labelled with two different values. Further at step 507, the control logic 500 may re-label the tokens when the accuracy is below the accuracy threshold.

At step 508, the control logic 500 may perform alphabetic embedding over the plurality of tokens which may provide a broader view in analyzing the pattern of alphabetical order. The representation may starts with 0, 1, 00, 01, 10, 11 or the like. Moreover, the representation may help to reduce the size of the embedding as well as helps to figure out patterns. The patterns may include similar kind of words which may have different meaning but the alphabetical embedding may be similar. Additionally, the representation may help to determine the linguistic behavior of the two sentence. For example, 'hire' and 'fire' may have two different meaning but similar linguistic format. Hence, 'hire' and 'fire' may be used as a matching tokens in order to match rhythms between two different sentences. Also, the pattern matching may be used to detect rhythms between the associated sentences. The alphabetical representation over the plurality of tokens may be helpful for detecting a poetry linguistic feature. Moreover, the alphabetical representation also be helpful for natural language generation. Hence, detecting the matching token relativity may be added as another class to train the plurality of corpus for feature cluster.

Further at step 509, the labeled tokens may be forwarded to feed layer upon accepting the accuracy of the ANN. Further the plurality of instances, the plurality of entities and the values may be used in the form of word vector for the training of the ANN. The training of the ANN may include manipulation of weight and bias on the values. While training, the control logic 500 may use n-fold cross validation technique for further calculation of accuracy at step 510. The n-fold cross validation technique may calculate the amount of right prediction based on the training set and amount of wrong prediction on the same training set. Based on the prediction, the training set may be provided with accuracy value ranging between 0-1. It should be noted that a training set may be the plurality of tokens, which may be selected to train the ANN.

Further, at step 511, a check point may be created upon training the ANN for further error calculation. The checkpoint may categorize the training set into three conditions based on the accuracy value. The three conditions are:

a) Perfect: When the accuracy value may be within the predefined range then the training set may be categorize as perfect at step 512. It should be noted that in perfect category, the training set may be properly labeled and prediction result may be similar with the label it has been trained;

b) Underfit: When the accuracy value may be may be below the predefined value then the training set may be categorize as underfit. It should be noted that the accuracy value may be below the predefined range because of less data volume, mislabeling, incomplete training dataset or the like. Hence, the accuracy value get reduced; and c) Overfit: When the accuracy value may be may be above the predefined value then the training set may be categorize as overfit. It should be noted that the accuracy value may be above the predefined range because of false label prediction. Further, the control logic 500 may decompose false label prediction to make perfect.

At step 513, when the accuracy value may be either underfit or overfit then the control logic 500 may re-check the training set and then feed a correct training set for training. This process may continue until the accuracy value reaches to the perfect category. When the ANN may be underfit, the control logic 500 may take any sentence and pattern and further feed the same with replacing the values. The sentence and linguistic patterns may be picked from the nearby vector values which makes similar instance but different entity. Additionally, using the linguistic forms, the control logic 500 may replace the value with the underweight values and further the training set may be created by the control logic 500 without user intervention. When the accuracy values may be overfit and not predicting in the manner or pattern of the training form but providing high accuracy, in that case the control logic 500 may re-phrase and unlabeled an associated entity. Further, the control logic 500 may create a separate instance with the name of the associated entity but not labeled. The separate instance may test the presence of the word vector and linguistic form of the associated entity which helps to predict the correct entity and so makes perfect fit while training the ANN.

As will be also appreciated, the above described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 6:
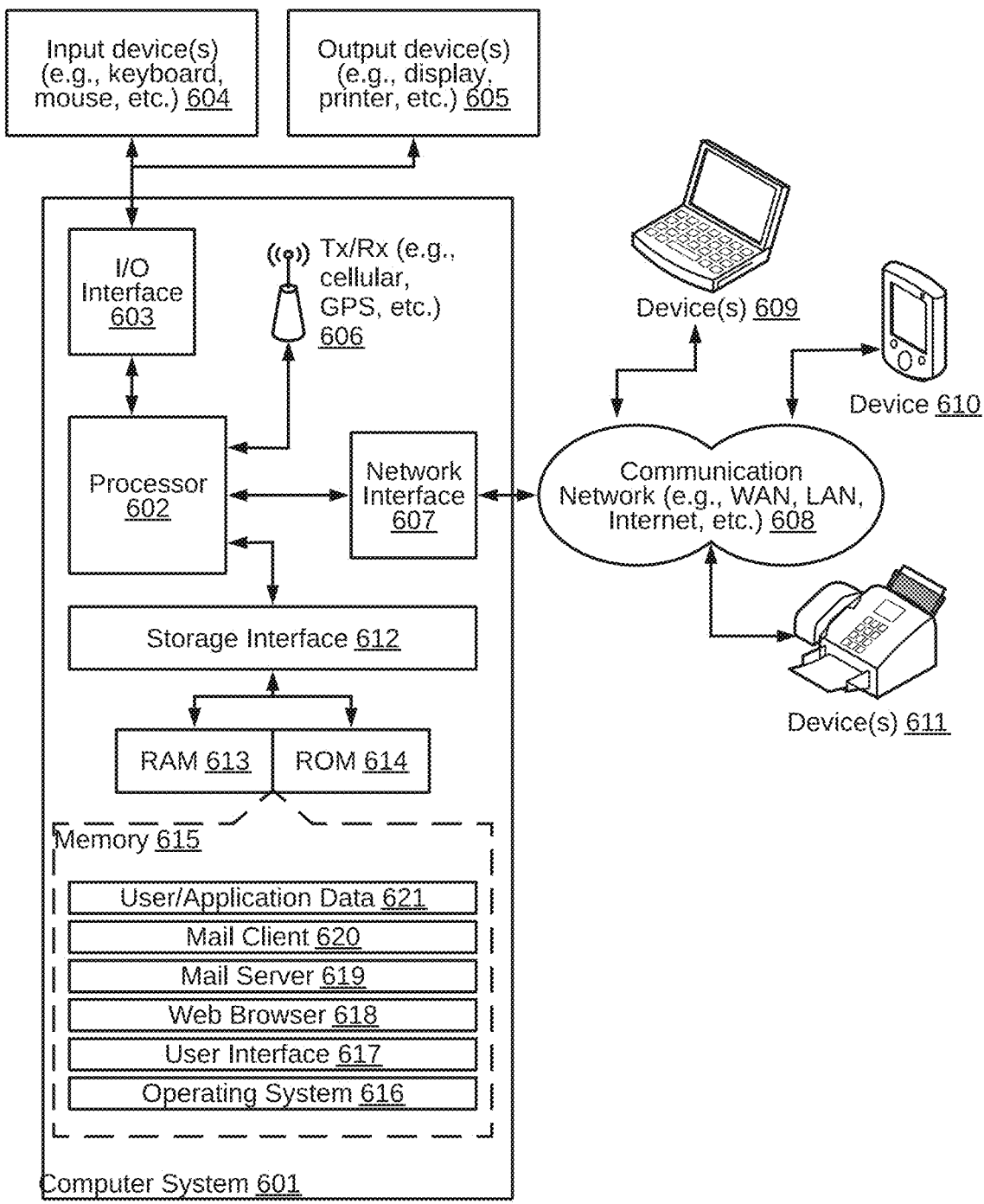
FIG. 6 is a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 6, a block diagram of an exemplary computer system 601 for implementing embodiments consistent with the present disclosure is illustrated. Variations of computer system 601 may be used for implementing system 100, ANN modelling device 101, and automatic annotation device 105 for annotating tokens for NLP. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, near field communication (NFC), FireWire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY® PLAYSTATION®, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8, etc.), APPLE® IOS®, GOOGLE® ANDROID®, BLACKBERRY® OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 601 may implement a web browser 618 stored program component. The web browser may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 601 may implement a mail server 619 stored program component. The mail server may be an Internet mail server such as MICROSOFT® EXCHANGE®, or the like. The mail server may utilize facilities such as ASP, ActiveX, ANSI C++/C#, MICROSOFT .NET® CGI scripts, JAVA®, JAVASCRIPT®, PERL®, PHP®, PYTHON®, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as APPLE MAIL®, MICROSOFT ENTOURAGE®, MICROSOFT OUTLOOK®, MOZILLA THUNDERBIRD®, etc.

In some embodiments, computer system 601 may store user/application data 621, such as the data, variables, records, etc. (e.g., datasets, corpus, ANN model, user input with respect to the ANN model, instances, entities, tokens, a pattern of tokens, accuracy threshold, pre-defined range, and so forth) as described in this disclosure. Such databases may be implemented as fault-tolerant, relational, scalable, secure databases such as ORACLE® OR SYBASE®. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above provide for annotating tokens for training ANN models employed for various NLP applications. In particular, the techniques provide for intelligent and automatic annotation of tokens in the training data set and further for labelling of annotated tokens. This is achieved by intelligent and automatic identification of various instances in the training dataset, various entities associated with each of the instances, and values associated with each of the entities. Additionally, the techniques described above do not need human involvement for annotating tokens. As will be appreciated, the automatic annotation of tokens may not only reduce the time required for annotating and labelling tokens, but also increasing the accuracy of annotating and labelling the tokens. This, in turn, increase the efficiency and accuracy of training the ANN models for NLP applications. Additionally, the automatic annotation of tokens may reduce the human cost and computation cost. Moreover, the techniques may help reduce the consumption of physical memory while processing the tokens, thereby reducing cost of memory.

The specification has described method and system for annotating tokens for NLP. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of creating a new training set for training a neural network, the method comprising:
  segmenting, by an automatic annotation device, a corpus based on each of a plurality of instances,
    wherein each of the plurality of instances corresponds to a linguistic cluster and comprises at least one of a word, a statement, a phrase, or a clause from the corpus;
  deriving, by the automatic annotation device, a plurality of entities for each of the plurality of instances based on their associativity to each of the plurality of instances using at least one of a machine learning technique or a deep learning technique;

determining, by the automatic annotation device, a word vector for each of the plurality of entities associated with each of the plurality of instances;

labelling, by the automatic annotation device, a plurality of tokens in the word vector for each of the plurality of instances,
  wherein the plurality of tokens associated with the plurality of entities are identified based on a frequency of each of the plurality of tokens in each of the plurality of entities;

training, by the automatic annotation device, the neural network based on the plurality of tokens, when the accuracy of each of the plurality of token is above an accuracy threshold;

determining, by the automatic annotation device, a training-accuracy value of the training of the neural network, wherein the training-accuracy value indicates an accuracy of training prediction based on a training set;

when the training-accuracy value is below a predefined range,
  creating, by the automatic annotation device, a new training set by replacing values in sentences and linguistic patterns of the training set with nearby vector values; and when the training-accuracy value is above the predefined range,
  rephrasing and unlabelling, by the automatic annotation device, an associated entity of the training set;
  creating, by the automatic annotation device, a separate instance with the name of the associated entity; and
  creating by the automatic annotation device, a new training set by predicting a correct entity by testing a presence of the word vector and linguistic form of the associated entity using the separate instance,
    wherein the training-accuracy value is below the predefined range in one iteration and above the predefined range in another iteration.

2. The method of claim 1, further comprising:
receiving a plurality of dataset for the plurality of instances from at least one of a website, a portable document format (PDF), a research paper, a journal, or an article; and
determining the corpus by clubbing each of the plurality of dataset.

3. The method of claim 1, further comprising:
determining a pattern for each of the plurality of tokens based on an alphabetic embedding; and
identifying matching tokens of the plurality of tokens based on the pattern, wherein the matching tokens is used to identify at least one of a rhythm, a poetry, or a prose.

4. The method of claim 1, wherein labelling the plurality of tokens comprises:
measuring the labelling-accuracy of each of the plurality of tokens for each of the plurality of instances using a confusion matrix; and
re-labelling the plurality of tokens for each of the plurality of instances when the labelling-accuracy is below the accuracy threshold, wherein the accuracy threshold can be scaled up or scaled down based on a mistake performed by the neural network.

5. A system for creating a new training set for training a neural network, the system comprising:
an automatic annotation device comprising at least one processor and a computer-readable medium storing instructions that, when executed by the at least one processor, cause the at least one processor to perform operations comprising:
segmenting a corpus based on each of a plurality of instances, wherein each of the plurality of instances corresponds to a linguistic cluster and comprises at least one of a word, a statement, a phrase, or a clause from the corpus;
deriving a plurality of entities for each of the plurality of instances based on their associativity to each of the plurality of instances, using at least one of a machine learning technique and a deep learning technique;
determining a word vector for each of the plurality of entities associated with each of the plurality of instances;
labelling a plurality of tokens in the word vector for each of the plurality of instances, wherein the plurality of tokens associated with the plurality of entities are identified based on a frequency of each of the plurality of tokens in each of the plurality of entities;
training the neural network based on the plurality of tokens, when a labelling-accuracy of each of the plurality of tokens is above an accuracy threshold;
determining a training-accuracy value of the training of the neural network, wherein the training-accuracy value indicates an accuracy of training prediction based on a training set;
when the training accuracy value is below a pre-defined range, creating a new training set by replacing values in sentences and linguistic patterns of the training set with nearby vector values; and
when the training-accuracy value is above the predefined range,
rephrasing and unlabelling an associated entity of the training set;
creating a separate instance with the name of the associated entity; and
creating a new training set by predicting a correct entity by testing a presence of the word vector and linguistic form of the associated entity using the separate instance.

6. The system of claim 5, wherein the instructions cause the at least one processor to perform operations further comprising:
receiving a plurality of dataset for the plurality of instances from at least one of a website, a portable document format (PDF), a research paper, a journal, or an article; and
determining the corpus by clubbing each of the plurality of dataset.

7. The system of claim 5, wherein the instructions cause the at least one processor to perform operations further comprising:
determining a pattern for each of the plurality of tokens based on an alphabetic embedding; and
identifying matching tokens of the plurality of tokens based on the pattern, wherein the matching tokens is used to identify at least one of a rhythm, a poetry, or a prose.

8. The system of claim 5, wherein labelling the plurality of tokens comprises:
measuring the labelling-accuracy of each of the plurality of tokens for each of the plurality of instances using a confusion matrix; and re-labelling the plurality of tokens for each of the plurality of instances when the labelling-accuracy is below the accuracy threshold, wherein the accuracy threshold can be scaled up or scaled down based on a mistake performed by the neural network.

9. A non-transitory computer-readable medium storing computer-executable instructions for:

segmenting a corpus based on each of a plurality of instances, wherein each of the plurality of instances corresponds to a linguistic cluster and comprises at least one of a word, a statement, a phrase, or a clause from the corpus;

deriving a plurality of entities for each of the plurality of instances based on their associativity to each of the plurality of instances, using at least one of a machine learning technique and a deep learning technique;

determining a word vector for each of the plurality of entities associated with each of the plurality of instances;

labelling a plurality of tokens in the word vector for each of the plurality of instances, wherein the plurality of tokens associated with the plurality of entities are identified based on a frequency of each of the plurality of tokens in each of the plurality of entities;

training the neural network based on the plurality of tokens, when a labelling-accuracy of each of the plurality of tokens is above an accuracy threshold;

determining a training-accuracy value of the training of the neural network, wherein the training-accuracy value indicates an accuracy of training prediction based on a training set;

when the training-accuracy value is below a predefined range,
 creating a new training set by replacing values in sentences and linguistic patterns of the training set with nearby vector values; and when the training-accuracy value is above the predefined range,
 rephrasing and unlabelling an associated entity of the training set;
 creating a separate instance with the name of the associated entity; and
 creating a new training set by predicting a correct entity by testing a presence of the word vector and linguistic form of the associated entity using the separate instance.

10. The non-transitory computer-readable medium of claim 9, further storing computer-executable instructions for:

receiving a plurality of dataset for the plurality of instances from at least one of a website, a portable document format (PDF), a research paper, a journal, or an article; and determining the corpus by clubbing each of the plurality of dataset.

11. The non-transitory computer-readable medium of claim 9, further storing computer-executable instructions for:

determining a pattern for each of the plurality of tokens based on an alphabetic embedding; and identifying matching tokens of the plurality of tokens based on the pattern, wherein the matching tokens is used to identify at least one of a rhythm, a poetry, or a prose.

12. The non-transitory computer-readable medium of claim 9, wherein labelling the plurality of tokens comprises:

measuring the labelling-accuracy of each of the plurality of tokens for each of the plurality of instances using a confusion matrix; and re-labelling the plurality of tokens for each of the plurality of instances when the labelling-accuracy is below the accuracy threshold, wherein the accuracy threshold can be scaled up or scaled down based on a mistake performed by the neural network.

\* \* \* \* \*